United States Patent Office 3,736,343
Patented May 29, 1973

3,736,343
LOWER ALKYL 3-(5-CHLOROSALICYLIDENE) DITHIOCARBAZATES
John F. Olin, Ballwin, Mo., assignor to Monsanto Company, St. Louis, Mo.
No Drawing. Original application Aug. 13, 1969, Ser. No. 849,902, now Patent No. 3,629,447. Divided and this application May 3, 1971, Ser. No. 139,966
Int. Cl. C07c 155/08
U.S. Cl. 260—455 A        5 Claims

ABSTRACT OF THE DISCLOSURE

Control of the scab fungus, *Venturia inaequalis*, employing a lower alkyl 3-(5-chlorosalicylidene)dithiocarbazate.

---

This application is a division of applicant's copending application Ser. No. 849,902, filed Aug. 13, 1969, now U.S. Pat. No. 3,629,447.

This invention relates to the control of the scab fungus, *Venturia inaequalis*, employing a lower alkyl 3-(5-chlorosalicylidene)dithiocarbazate of the formula

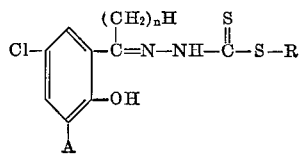

wherein $n$ is a number from 0 to 1, but preferably 0, wherein R is lower alkyl (that is methyl, ethyl, propyl and butyl, and the various isomeric forms thereof, but preferably methyl), and wherein A is H or Cl, but preferably Cl, in an effective fungicidal amount.

The preferred scab fungicide of this invention is methyl 3 - (3,5 - dichlorosalicylidene)dithiocarbazate, a cream colored solid melting at about 210° C. with decomposition. It can be prepared by bringing together substantially equimolecular proportions of 3,5-dichlorosalicylaldehyde and methyl dithiocarbazate in the presence of sufficient methyl alcohol to maintain a solution thereof, heating the so prepared solution to its boiling point, cooling the mass to room temperature, filtering off the crystalline solid, washing the filtered solids with methyl alcohol, and thereafter air drying the so-washed solids.

(*Analysis.*—36.87% C, 9.46% N, 21.55% S. Calculated for $C_9H_8Cl_2N_2OS_2$: 36.62% C, 9.49% N, 21.72% S.)

To illustrate the scab fungicidal activity of methyl 3-(3,5 - dichlorosalicylidene)dithiocarbazate, it and N-(trichloromethylthio) - 4-cyclohexene-1,2-dicarboximide, the commercial foliage fungicide for control of *Venturia inaequalis* marketed as "Captan," were compared by identical procedures as follows:

(a) Eradicant: One year old growing vigorous apple seedlings were inoculated with an aqueous spore suspension of the scab fungus organism, *Venturia inaequalis*. After drying, the inoculated seedlings were held at 100% relative humidity for 24 hours at 65° F. to allow the infection to develop. The infected seedlings were removed and uniformly sprayed with acetone solutions of each of said compounds in concentrations of 300 p.p.m. and 60 p.p.m. The sprayed seedlings were then placed in a humidity cabinet and held at about room temperature for 48 hours. The seedlings were then removed and the percent control of the fungus determined by counting the number of seedlings free of the fungus. The results were as follows (average of two evaluations):

| | Percent | |
|---|---|---|
| Concentration, p.p.m. | 300 | 60 |
| Compound: | | |
| Methyl 3-(3,5-dichlorosalicylidene) dithiocarbazate | 82 | 43 |
| N-(trichloromethylthio)-4-cyclohexene-1, 2-dicarboximide | 17 | 0 |
| Control [1] | 0 | 0 |

[1] Seedlings inoculated with the scab fungus organism but not sprayed with fungicidal agent.

(b) Protectant: One year old growing vigorous apple seedlings were sprayed uniformly with acetone solutions of each of said compounds of (a) above in concentrations of 300 p.p.m. and 60 p.p.m. After drying the seedlings were inoculated with an aqueous spore suspension of the scab fungus organism, *Venturia inaequalis*. After drying, the inoculated seedlings were placed in a humidity cabinet and held at about room temperature for 48 hours. The seedlings were then removed and the percent control of the fungus determined by counting the number of seedlings free of the fungus. The results were as follows (average of two evaluations):

| | Percent | |
|---|---|---|
| Concentration, p.p.m. | 300 | 60 |
| Compound: | | |
| Methyl 3-(3,5-dichlorosalicylidene) dithiocarbazate | 95 | 90 |
| N-(trichloromethylthio)-4-cyclohexene-1,2-dicarboximide | 86 | 21 |
| Control [1] | 0 | 0 |

[1] Seedlings not sprayed with fungicidal agent but inoculated with the scab fungus organism.

Other lower alkyl 3-(5-chlorosalicylidene)dithiocarbazates of this invention for control of *Venturia inaequalis* include ethyl 3-(3,5-dichlorosalicylidene)dithiocarbazate,
isopropyl 3-(3,5-dichlorosalicylidene)dithiocarbazate,
n-butyl 3-(3,5-dichlorosalicylidene)dithiocarbazate,
methyl 3-(5-chlorosalicylidene)dithiocarbazate,
n-propyl 3-(5-chlorosalicylidene)dithiocarbazate,
methyl 3 - (α-methyl-3,5-dichlorosalicylidene)dithiocarbazate,
isobutyl 3 - (α-methyl-3,5-dichlorosalicylidene)dithiocarbazate,
methyl 3-(α-methyl-5-chlorosalicylidene)dithiocarbazate,
isopropyl 3 - (α - methyl-5-chlorosalicylidene)dithiocarbazate, and the like, which are prepared in like manner to the preferred species described hereinbefore from substantially equimolecular proportions of the appropriate 5-chlorosalicylaldehyde of the formula

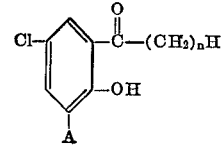

wherein n and A have the aforedescribed significances, and the appropriate lower alkyl dithiocarbazate of the formula $NH_2$—NH—CS—S—R wherein R has the aforedescribed significance in the presence of an alcohol of the formula ROH wherein R has the same significance as aforedescribed. For example, methyl 3-(5-chlorosalicylidene)dithiocarbazate, a pale yellow solid melting at about 210° C. with decomposition, is prepared by boiling a methyl alcohol solution of substantially equimolecular proportions of 5-chlorosalicylaldehyde and methyl dithiocarbazate, and methyl 3-($\alpha$-methyl-3,5-dichlorosalicylidene)dithiocarbazate; a yellow solid melting at about 198° C. with decomposition, is prepared by boiling a methyl alcohol solution of substantially equimolecular proportions of o-hydroxy-m, m'-dichloroacetophenone and methyl dithiocarbazate.

To further illustrate the activity of the fungicidal agents of this invention in a standard slide germination test it was observed that at a concentration of 10 p.p.m. methyl 3-(5-chlorosalicylidene)dithiocarbazate and methyl 3-($\alpha$-methyl - 3,5-dichlorosalicylidene)dithiocarbazate, respectively, exhibited complete control of *Venturia inaequalis*. In the same slide germination test ethyl 2-phenyl thionocarbazate (U.S. 2,673,159), methyl dithiocarbazate (U.S. 3,287,099), allyl dithiocarbazate, benzyl dithiocarbazate, benzyl 3-(3,5-dichlorosalicylidene)dithiocarbazate (a yellow solid melting at about 207° C. with decomposition, prepared in benzyl alcohol at about 100° C. from equimolecular proportions of benzyl dithiocarbazate and 3,5-dichlorosalicylaldehyde), 4-chlorobenzyl 3-(3,5-dichlorosalicylidene)dithiocarbazate (a yellowish solid melting at about 171° C. with decomposition, prepared from equimolecular proportions of 4-chlorobenzyl dithiocarbazate and 3,5-dichlorosalicylaldehyde), and 2,3,6-trichlorobenzyl dithiocarbazate, respectively, exhibited no control of *Venturia inaequalis* at the same concentration of 10 p.p.m.

Although the novel fungicidal agents of this invention are useful per se in controlling *Venturia inaequalis*, it is preferable that they be supplied to the organism or to the horticultural environment of the organism in a dispersed form in a suitable extending agent. It is to be understood that the term "dispersed" is used in its widest possible sense. When it is said that the fungicidal agents of this invention are dispersed, it means that the particles of the fungicidal agents of this invention can be molecular in size and held in true solution in a suitable organic solvent. It means further, that the particles can be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they can be actually dissolved in the semi-solid or held in suspension in the semi-solid with the aid of suitable wetting or emulsifying agents. The term "dispersed" also means that the particles can be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agents of this invention in a carrier such as dichloro-difluoromethane and like fluorochloroalkanes which boil below room temperature at atmospheric pressure. Also it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal agents of this invention employed in combatting or controlling *Venturia inaequalis* can vary considerably provided the required dosage (i.e., toxic amount) thereof is supplied to the organism or to the horticultural environment of the organism. When the extending agent is a liquid or mixture of liquids (e.g. as in solutions, suspensions, emulsions, or aerosols), the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfontable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organism or to the horticultural environment of the organism as aerosols, it is convenient to dissolve them in a suitable solvent and disperse the resulting solution in dichlorodifluoromethane or like chlorofluoroalkane which boils below room temperature at atmospheric pressure.

The fungicidal agents of this invention are preferably supplied to the fungal organism or to the horticultural environment of the organism in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anion-active (or anionic) or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued Aug. 5, 1958). In general it is preferred that a mixture of water-soluble anionic and water-soluble non-ionic surfactants be employed.

The fungicidal agents of this invention can be dispersed by suitable methods (e.g., tumbling or grinding) in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophillite diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting *Venturia inaequalis* or they can be provided in a concentrated form suitable for mixing with or dispersing in other extending agents. As illustrative of a particularly useful concentrate is an intimate mixture of one or more fungicidal agents of this invention with a water-soluble surfactant which lowers the surface tension of water in the weight proportions of 0.1 to 15 parts of surfactant with sufficient of a fungicidal agent of this invention to make 100 parts by weight. Such a concentrate is particularly adapted to be made into a spray for combatting *Venturia inaequalis* by the addition of water thereto. As illustrative of such a concentrate is an intimate mixture of 95 parts by weight of methyl 3-(3,5-dichlorosalicylidene)dithiocarbazate and 5 parts by weight of a water-soluble non-ionic surfactant such as the polyoxyethylene derivative of sorbitan monolaurate.

Another useful concentrate adapted to be made into a spray for combatting *Venturia inaequalis* is a solution (preferably as concentrated as possible) of one or more fungicidal agents of this invention in an organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of methyl 3-(3,5-dichlorosalicylidene)dithiocarbazate in alcohol which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bactericides, and herbicides. In this manner it is possible to obtain mixtures which are effective against a wide variety of pests and other forms of noxious life.

In controlling or combatting *Venturia inaequalis* the fungicidal agents of this invention either per se or compositions comprising same are supplied to the fungal organism or to its horticultural environment in a toxic amount. This can be done by dispersing the new fungicidal agent or fungicidal composition comprising same in, on or over an infested environment or in, on or over an environment the fungal organism frequents, e.g. agricultural soil or other growth media or other media infested with the fungal organism or attractable to the organism for habitational or sustenance or propagational purposes, in any conventional fashion which permits contact between the organism and the fungicidal agents of this invention. Such dispersing can be brought about by applying the fungicidal agent per se or sprays or particulate solid compositions containing same to a surface infested with the fungal organism or attractable to the organism, as for example, the surface of agricultural soil or other media such as the above ground surface of plants by any of the conventional methods, e.g. power dusters, broom and hand sprayers, and spray dusters.

What is claimed is:

1. A lower alkyl 3-(5-chlorosalicylidene) dithiocarbazate of the formula $$Cl-\underset{\underset{A}{\bigcirc}}{\bigcirc}\underset{OH}{\overset{(CH_2)_nH}{-C=N-NH-\overset{S}{\overset{\|}{C}}-S-R}}$$

wherein $n$ is a number from 0 to 1, inclusive, wherein R is lower alkyl selected from the group consisting of methyl, ethyl, propyl, butyl and isomers thereof, and wherein A is selected from the group consisting of H and Cl.

2. A compound of claim 1 wherein R is methyl and A is Cl.

3. The compound of claim 2 wherein $n$ is 0, which is methyl 3-(3,5-dichlorosalicylidene)dithiocarbazate.

4. The compound of claim 2 wherein $n$ is 1, which is methyl 3-(α-methyl-3,5-dichlorosalicylidene)dithiocarbazate.

5. The compound of claim 1 wherein $n$ is 0, R is methyl and wherein A is H, which is methyl 3-(5-chlorosalicyclidene)dithiocarbazate.

References Cited

UNITED STATES PATENTS

| | | | |
|---|---|---|---|
| 3,284,482 | 11/1966 | D'Amico et al. | 260—455 A |
| 2,673,159 | 3/1954 | Beaver | 260—455 A |
| 3,395,234 | 7/1968 | Hopkins et al. | 260—455 A |

FOREIGN PATENTS

| | | | |
|---|---|---|---|
| 1,572,191 | 5/1969 | France | 260—455 A |

OTHER REFERENCES

Ried et al.: "New Hydrazine Ders. of Aromatic Aldehydes" (1954), CA 49, pp. 6907–08 (1955).

Skagius: "Potential Chemotherapeutics etc," (1961), Antibiotics and Chemotherapeutics, vol. 11, No. 1, pp. 31–36 (1961).

LEWIS GOTTS, Primary Examiner

G. HOLLRAH, Assistant Examiner

U.S. Cl. X.R.

424—300